United States Patent
Yoshida

(10) Patent No.: US 8,550,543 B2
(45) Date of Patent: Oct. 8, 2013

(54) VEHICLE BODY STRUCTURE

(75) Inventor: Koji Yoshida, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/381,674

(22) PCT Filed: Oct. 26, 2009

(86) PCT No.: PCT/JP2009/068321
§ 371 (c)(1),
(2), (4) Date: Dec. 30, 2011

(87) PCT Pub. No.: WO2011/052026
PCT Pub. Date: May 5, 2011

(65) Prior Publication Data
US 2012/0104804 A1   May 3, 2012

(51) Int. Cl.
*B60J 7/00* (2006.01)
(52) U.S. Cl.
USPC ............ 296/187.09; 296/187.1; 280/784
(58) Field of Classification Search
USPC ............ 296/187.09, 187.1; 280/784; 180/274
See application file for complete search history.

(56) References Cited

U.S. PATENT DOCUMENTS

| | | | | |
|---|---|---|---|---|
| 5,605,353 | A * | 2/1997 | Moss et al. | 280/784 |
| 5,884,963 | A * | 3/1999 | Esposito et al. | 296/187.09 |
| 7,562,886 | B2 * | 7/2009 | Takeda et al. | 280/124.109 |
| 7,815,245 | B2 * | 10/2010 | Hiraishi et al. | 296/187.09 |

FOREIGN PATENT DOCUMENTS

| | | |
|---|---|---|
| JP | 2003 26037 | 1/2003 |
| JP | 2005 247091 | 9/2005 |
| JP | 2008 37112 | 2/2008 |

OTHER PUBLICATIONS

International Search Report Issued Jan. 12, 2010 in PCT/JP09/68321 Filed Oct. 26, 2009.
English Translation of the International Preliminary Report on Patentability issued Jun. 21, 2012 in PCT/JP2009/068321.

* cited by examiner

Primary Examiner — Joseph D. Pape
Assistant Examiner — Dana Ivey
(74) Attorney, Agent, or Firm — Oblon, Spivak, McClelland, Maier & Neustadt, L.L.P.

(57) ABSTRACT

Disclosed is a vehicle body structure that can improve the absorption performance of a load applied to a vehicle is provided. When a load is applied, the sub-side member retreats as a link member turns. Additionally, the retreat of the sub-side member is suppressed when the link member reaches a termination position of the turning. As the link member turns, the sub-side member can reliably retreat to a target position. The link member can turn to retreat the sub-side member, and simultaneously apply a reaction force against the load. Additionally, the sub-side member can generate a large reaction force against the load after having retreated to the target position. Through the above, the sub-side member can move reliably while generating a reaction force to attenuate the load until the member retreats to the target position, and can generate a large reaction force after the member has retreated to the target position.

3 Claims, 9 Drawing Sheets

Fig.4
(a)
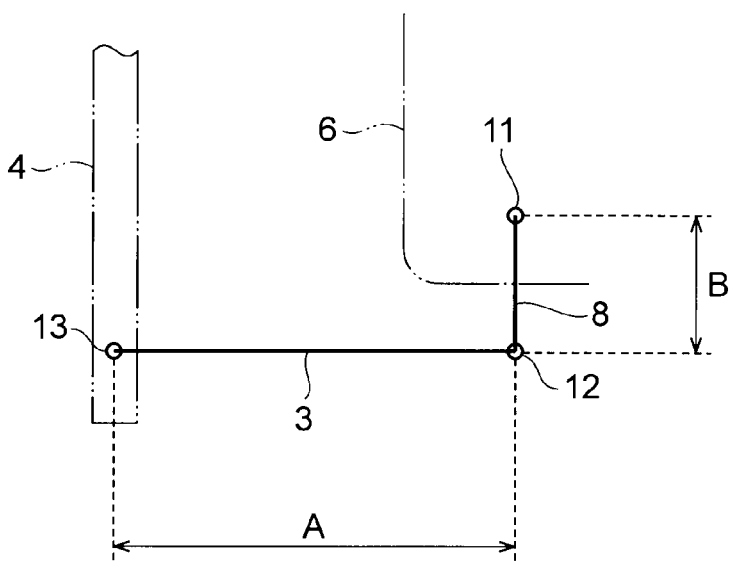
(b)
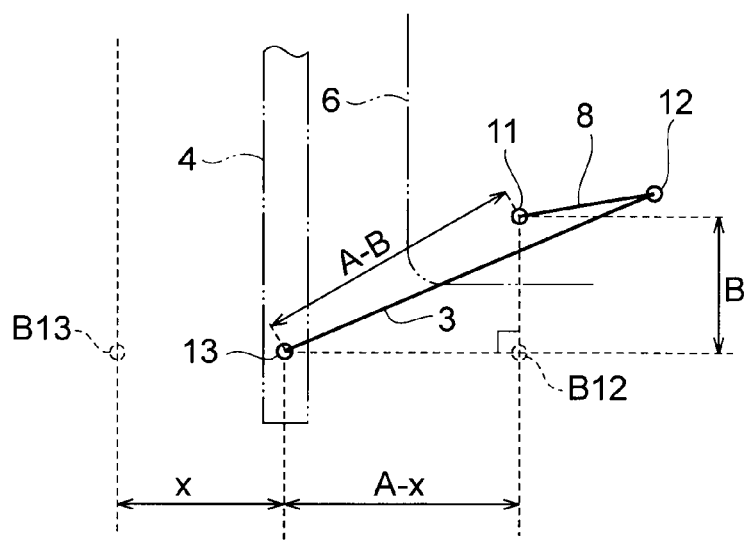

VEHICLE BODY STRUCTURE

TECHNICAL FIELD

The present invention relates to a vehicle body structure in a vehicle.

BACKGROUND ART

A vehicle body structure including a side member extending in a front-and-rear direction of a vehicle, a sub-side member juxtaposed to the side member, and a radiator support provided at the tip of the side member is known as a related-art vehicle body structure (for example, Patent Literature 1). In this vehicle body structure, a load is transmitted rearward by the sub-side member.

CITATION LIST

Patent Literature

Patent Literature 1: Japanese Unexamined Patent Application Publication No. 2008-37112

SUMMARY OF INVENTION

Technical Problem

Here, in the above-described vehicle body structure, it is required that the structure is made more suitable, whereby the absorption performance of a load applied to a vehicle is improved when the load is applied to the front side of the vehicle.

The invention has been made in order to solve such problems, and the object thereof is to provide a vehicle body structure that can improve the absorption performance of a load applied to the front side of a vehicle.

Solution to Problem

A vehicle body structure related to the invention includes: a side member that extends in a front-and-rear direction of a vehicle; and a sub-side member juxtaposed to the side member. The sub-side member is coupled to a suspension member, and is movable relative to the suspension member as a load is applied.

According to the vehicle body structure related to the invention, the sub-side member is coupled to the suspension member, and is movable relative to the suspension member as a load is applied. Since the sub-side member and the suspension member are coupled to each other, the members have a given holding force. Accordingly, when a load is applied, the sub-side member can move relatively, and simultaneously, can generate a reaction force against the load. Accordingly, the load can be attenuated even during the retreat of the sub-side member. As the sub-side member performs relative movement in this way, it is possible to suppress deforming at an unexpected position by which bending dose not generate a reaction force in an initial stage where the load is applied. Through the above, the absorption performance of the load applied to the front side of the vehicle can be improved.

The vehicle body structure related to the invention further includes a turning part that is connected to the sub-side member and the suspension member, and turns to the rear of the vehicle as a load is applied to the sub-side member. The sub-side member retreats as the turning part turns, and the retreat of the sub-side member is suppressed as the turning part reaches the termination position of the turning.

According to the vehicle body structure related to the invention, when a load is applied, the sub-side member retreats as the turning part turns. Additionally, the retreat of the sub-side member is suppressed when the turning part reaches a termination position of the turning. As the turning part turns, the sub-side member can reliably retreat to a target position that is suitable to support the load. Here, when the turning part like a link mechanism is adopted, the link mechanism has a given holding force in order to support the sub-side member in a stage before a load is applied. Accordingly, the turning part can turn to retreat the sub-side member, and simultaneously generate a reaction force against the load. Accordingly, the load can be attenuated even during the retreat of the sub-side member. Additionally, the retreat of sub-side member is suppressed if the turning part reaches the termination position of the turning. Accordingly, the sub-side member can generate a large reaction force against the load after having retreated to the target position. Through the above, the sub-side member can move reliably while generating a reaction force to attenuate the load until the member retreats to the target position, and can generate a large reaction force after the member has retreated to the target position. Accordingly, after the side member is crushed to the target position, both the side member and the sub-side member can receive the load. Thereby, the load applied to the side member is distributed to the side member and the sub-side member. Accordingly, an upward moment applied to the kick section of the side member can be reduced. Through the above, the absorption performance of the load applied to the front side of the vehicle can be improved.

Additionally, in the vehicle body structure related to the invention, preferably, the turning part includes a link member that connects the sub-side member and the suspension member, the link member is fastened to the suspension member with a first fastening portion, the link member is fastened to the sub-side member with a second fastening portion, the link member turns to the rear of the vehicle with the first fastening portion as a fulcrum as a load is applied to the sub-side member, and the link member turns relative to the sub-side member with the second fastening portion as a fulcrum when a load is applied to the sub-side member. Fastening forces for holding the link mechanism are applied to the first fastening portion and the second fastening portion. Accordingly, when the link member turns, large reaction forces are generated in the first fastening portion and the second fastening portion. Thereby, the sub-side member can attenuate the load due to the reaction forces while retreating.

In the vehicle body structure related to the invention, preferably, the turning part includes a link member that connects a rear end portion of the sub-side member and the suspension member, the rear end portion of the sub-side member is arranged so as to be separated in the vehicle width direction from the suspension member via the link member, the link member turns along with the rear end portion of the sub-side member with a connecting portion to the suspension member as a fulcrum as a load is applied to the sub-side member, and the link member turns so as to approach the sub-side member as a load is applied to the sub-side member. As the link member turns in this way so as to approach the sub-side member, the link member and the sub-side member are integrated and become an integral member considered as a straight shape (for example, refer to FIG. 3). After the link member has reached the termination position of the turning, one member considered as a straight shape can generate a large reaction force against the load. Additionally, the rear end portion of the sub-side member is arranged so as to be spaced apart in the vehicle width direction from the suspension member via the link member. Accordingly, when the link member has turned, the rear end portion moves toward the suspension member. When the sub-side member extends in the front-and-rear direction of the vehicle, the sub-side member performs load transmission in a state where the sub-side member is inclined with respect to the front-and-rear direction of the vehicle after the turning of the link member. This can distribute the load.

In the vehicle body structure related to the invention, preferably, the sub-side member is connected to the suspension member via a sliding mechanism, and retreats as a load is applied. By providing the sliding mechanism, the sub-side member can retreat reliably along the sliding mechanism while generating a reaction force to attenuate the load when a load is applied.

In the vehicle body structure related to the invention, preferably, the sub-side member transmits a load rearward even after retreat movement. Since the sub-side member can transmit a load rearward even after the retreat movement, the absorption performance of the load can be further improved.

Advantageous Effects of Invention

According to the invention, the absorption performance of a load applied to a vehicle can be improved.

BRIEF DESCRIPTION OF DRAWINGS

FIGS. 4A and 4B are schematic views when the vehicle body structure related to the present embodiment is seen from above.

DESCRIPTION OF EMBODIMENTS

A preferred embodiment of a vehicle body structure related to the invention will be described below in detail with reference to the drawings.

Figure 1:
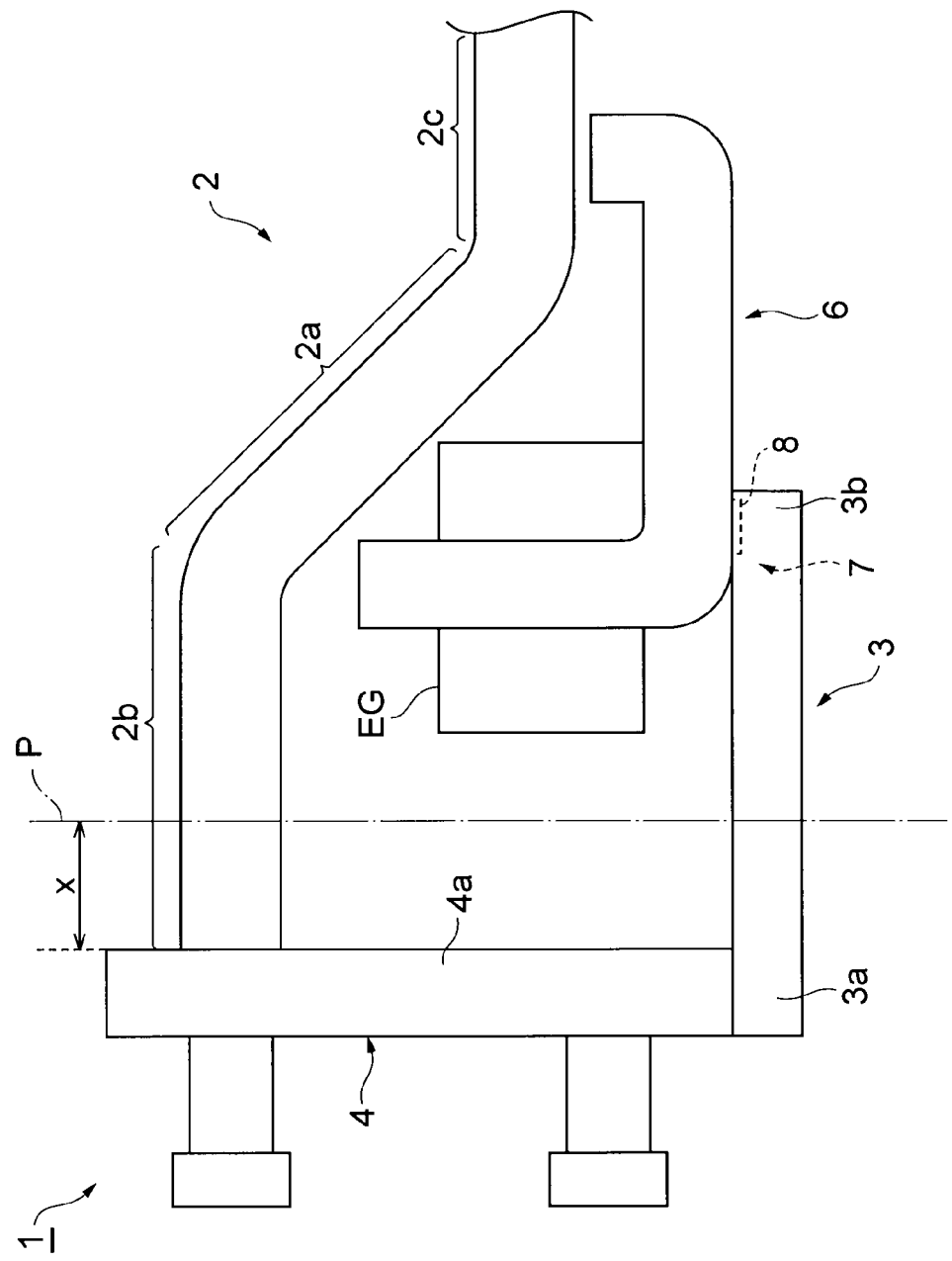
FIG. 1 is a side view of a schematic configuration when a vehicle body structure related to an embodiment of the invention is seen from the vehicle width direction.

FIG. 1 is a side view of a schematic configuration when the vehicle body structure 1 related to the embodiment of the invention is seen from the vehicle width direction. The vehicle body structure 1 is a skeletal structure on the front side of a vehicle. The vehicle body structure 1 has a function to absorb a load when the load is applied from the front direction of the vehicle. As shown in FIG. 1, the vehicle body structure 1 mainly includes a front side member 2, a sub-side member 3, a radiator support 4, a suspension member 6, and a power unit EG.

The front side member 2 is a pair of skeleton members that extends in the front-and-rear direction of the vehicle. The front side members 2 are respectively arranged on both sides in the vehicle width direction. The front side member 2 has a function to absorb a load when the load is applied to the front side of the vehicle. The front side member 2 has a kick section 2a that is inclined upward toward the front of the vehicle. Additionally, the front side member 2 has a front section 2b that extends in the front-and-rear direction of the vehicle, on the front side of the kick section 2a. The front side member 2 has a rear section 2c that extends in the front-and-rear direction of the vehicle, on the rear side of the kick section 2a. The front section 2b is arranged at a position higher than the rear section 2c.

The radiator support 4 is arranged on the front side of the front side member 2 and the sub-side member 3. The radiator support 4 is a member that supports a radiator (not shown). The radiator support 4 has a function to receive the load applied to the front side of the vehicle. The radiator support 4 has an upper radiator support, a lower radiator support, and a pair of side radiator supports 4a. The upper radiator support extends in the vehicle width direction on the upper side. The lower radiator support extends in the vehicle width direction on the lower side. The side radiator supports 4a extend in the up-and-down direction on both sides in the vehicle width direction. The side radiator supports 4a are coupled to the upper radiator support and the lower radiator support. Each of a pair of side radiator supports 4a is coupled to a front end of the front section 2b of each of the pair of front side members 2.

The suspension member 6 is a member to which a front suspension or the like is assembled. The suspension member 6 is arranged below the front side member 2. In the present embodiment, the suspension member 6 is arranged below the kick section 2a of the front side member 2.

The sub-side member 3 is a skeleton member juxtaposed to the front side member 2 below the front side member 2. The sub-side member 3 extends in the front-and-rear direction of the vehicle so as to be parallel to the front section 2b of the front side member 2. The sub-side member 3 has a function to absorb a load when the load is applied to the front side of the vehicle. A front end portion 3a of the sub-side member 3 is connected to the lower radiator support of the radiator support 4. Additionally, a rear end portion 3b of the sub-side member 3 is connected to the suspension member 6. The sub-side member 3 is configured to be movable relative to the suspension member 6 when a load is applied. Moreover, the sub-side member 3 is configured to transmit a load rearward even after its retreat movement. The detailed configuration of the sub-side member 3 will be described below.

The power unit EG is constituted by an engine or the like. The power unit EG is arranged in a region surrounded by the front side member 2, the sub-side member 3, the radiator support 4, and the suspension member 6. The power unit EG is arranged at a position spaced apart at a predetermined interval from the radiator support 4.

Figure 2:
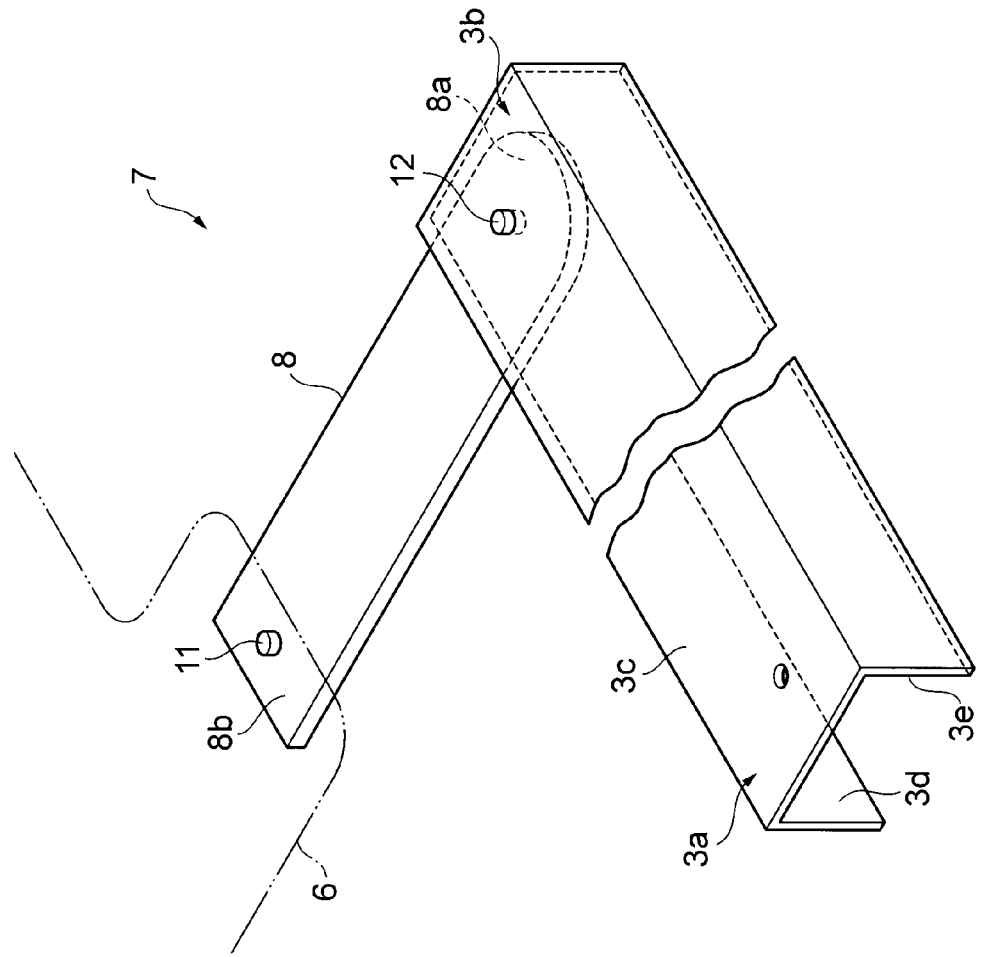
FIG. 2 is a perspective view showing a configuration in the vicinity of a sub-side member of the vehicle body structure related to the present embodiment.
Figure 3:
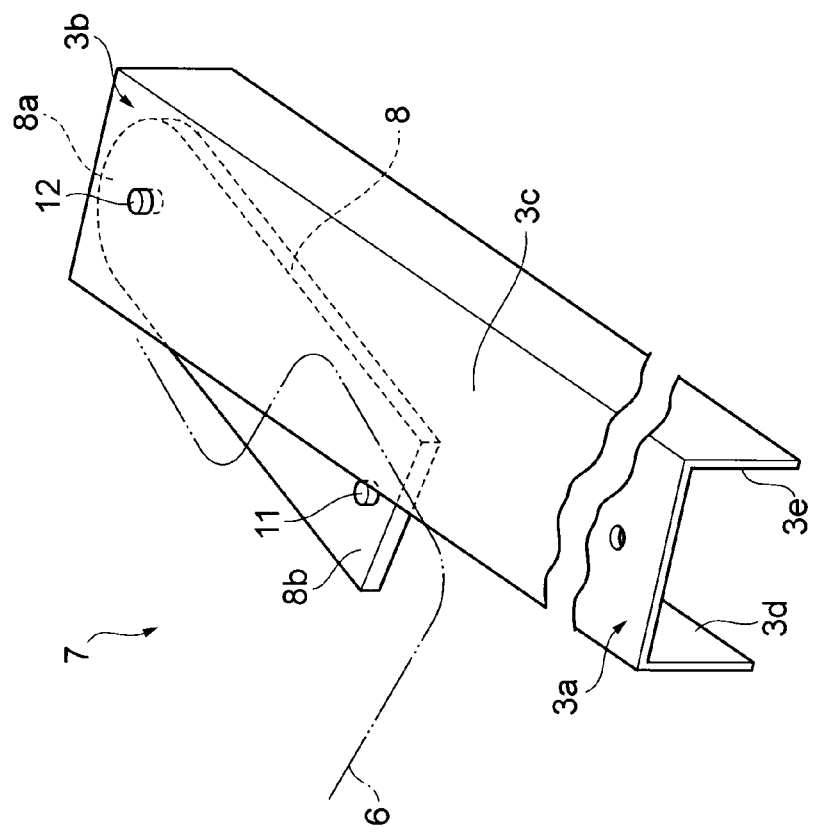
FIG. 3 is a perspective view showing an aspect when a load is applied to the sub-side member shown in FIG. 2.

Next, the configuration of the sub-side member 3 of the vehicle body structure 1 related to the present embodiment will be described below in detail with reference to FIGS. 2 and 3. FIG. 2 is a perspective view showing a configuration in the vicinity of the sub-side member 3 of the vehicle body structure 1 related to the present embodiment. FIG. 3 is a perspective view showing an aspect when a load is applied to the sub-side member 3 shown in FIG. 2.

As shown in FIG. 2, the sub-side member 3 includes a member having an upper wall 3c and right and left side walls 3d and 3e. The sub-side member 3 is connected to the suspension member 6 via a turning part 7. The turning part 7 is constituted by a link member 8 that extends in the vehicle width direction. The turning part 7 has a coupling portion that pivotally supports and couples the link member 8 and the suspension member 6, and a coupling portion that pivotally supports and couples the link member 8 and the sub-side member 3. Additionally, the turning part 7 is able to turn at the coupling portion on the suspension member 6 side to retreat the sub-side member 3. Although the cross-sectional shape of the link member 8 is not particularly required if the link member is a member that extends in the vehicle width direction, a long plate-like member is applied in the present embodiment. Through this configuration, the sub-side member 3 is arranged so as to be spaced apart in the vehicle width direction from the suspension member 6 via the turning part 7. One end portion 8a side of the link member 8 turns to the rear of the vehicle with the other end portion 8b side as a fulcrum when a load is applied to the sub-side member 3.

The other end portion 8b of the link member 8 located inside in the vehicle width direction is fastened to the suspension member 6 by a first fastening portion 11. The first fastening portion 11 passes through the link member 8 and the suspension member 6, and is constituted by a bolt and a nut that are connected by fastening the link member 8 and the suspension member 6. A fastening force is applied between the link member 8 and the suspension member 6 by the first fastening portion 11. The one end portion 8a of the link member 8 located outside in the vehicle width direction is fastened to the rear end portion 3b of the sub-side member 3 by a second fastening portion 12. The second fastening portion 12 passes through the link member 8 and the upper wall 3c of the sub-side member 3, and is constituted by a bolt and a nut that are connected by fastening the link member 8 and the sub-side member 3. A fastening force is applied between the link member 8 and the sub-side member 3 by the second fastening portion 12.

As shown in FIG. 3, the link member 8 performs turning when a larger load than the fastening forces of the first fastening portion 11 and the second fastening portion 12 is applied to the sub-side member 3. The link member 8 turns to the rear of the vehicle with the first fastening portion 11 as a fulcrum. The sub-side member 3 retreats to the rear of the vehicle as the turning part turns. Additionally, the link member 8 turns relative to the sub-side member 3 with the second fastening portion 12 as a fulcrum. Specifically, the angle between the link member 8 and the sub-side member 3 becomes small, and the link member 8 approaches the sub-side member 3. The fastening forces are applied to the first fastening portion 11 and the second fastening portion 12. Accordingly, even while the link member 8 is turning, transmission of the load from the sub-side member 3 is performed.

The termination position of the turning of the link member 8, as shown in FIG. 3, is a position where the link member 8 and the sub-side member 3 overlap and are integrated with each other. The link member 8 and the sub-side member 3 can be regarded as a substantially integral member at the termination position of the turning of the link member 8. In the example shown in FIG. 3, the position where a side portion of the upper wall 3c of the sub-side member 3 abuts on the first fastening portion 11 is set to the termination position. If the link member 8 reaches the termination position of the turning, the turning of the link member 8 stops. If the turning of the link member 8 stops, the link member 8 supports the sub-side member 3. Thereby, the retreat of the sub-side member 3 is suppressed by the link member 8.

The link member 8 may be connected to the top face of the upper wall 3c of the sub-side member 3 or may be connected to the bottom face of the upper wall 3c of the sub-side member 3. In the vehicle body structure 1 related to the present embodiment, the link member 8 is connected to the bottom face of the upper wall 3c of the sub-side member 3. In this case, in order for the link member 8 to perform turning, a side wall 3d at the rear end of the sub-side member 3 are partially cut out. Otherwise, a slit is provided in a portion of the side wall 3d of the sub-side member 3 so that the link member 8 can enter the bottom face side of the upper wall 3c of the sub-side member 3. Additionally, in the vehicle body structure related to the present embodiment, the position where the sub-side member 3 abuts on the first fastening portion 11 is the termination position of the turning. However, the position where the sub-side member 3 and the link member 8 overlap each other in the shape of a perfect straight line rather than abutting may be the termination position of the turning. For example, the link member 8 is connected to the top face side of the upper wall 3c of the sub-side member 3, and the link member 8 and the sub-side member 3 are separated from each other such that the first fastening portion 11 and the sub-side member 3 do not abut on each other.

Next, a method of determining the length of the link member 8 will be described with reference to FIGS. 1 and 4. FIGS. 4A and 4B are schematic views when the vehicle body structure 1 related to the present embodiment is seen from above. In FIG. 4, the radiator support 4 and a suspension member 6 are shown. Additionally, the sub-side member 3 and the link member 8 are shown by only main axes in FIGS. 4A and 4B for the purpose of illustration. FIGS. 4A and 4B show the first fastening portion 11 that fastens the link member 8 and the suspension member 6, the second fastening portion 12 that fastens the link member 8 and the sub-side member 3, and a third fastening portion 13 that fastens the sub-side member 3 and the radiator support 4. FIG. 4A shows an aspect of the vehicle body structure 1 before a load is applied to the sub-side member 3, and FIG. 4B shows an aspect of the vehicle body structure 1 when a load is applied to the sub-side member 3 and the link member 8 reaches the termination position of the turning. As shown in FIG. 1, a target crushing stroke x is set. The crushing stroke x is the distance between the radiator support 4 before a load is applied, and a target position of the radiator support 4 after a load is applied. The target position P of the radiator support 4 after a load is applied is set to a position in front of the power unit EG. In addition, when the link member 8 reaches the termination position of the turning, the radiator support 4 shall retreat the crush stroke x (refer to FIG. 4B).

As shown in FIG. 4A, the length of the sub-side member 3 is indicated by A. The length A is determined according to the arrangement of the radiator support 4 and the suspension member 6. The length of the link member 8 is indicated by B. In FIGS. 4A and 4B, in order to simplify the description, description will be made with the length between the third fastening portion 13 and the second fastening portion 12 being set to A and the length between the second fastening portion 12 and the first fastening portion 11 being set to B.

As shown in FIG. 4B, when a load is applied to the radiator support 4 and the sub-side member 3, the link member 8 turns and moves to the termination position. At this time, the sub-side member 3 retreats, and the rear end portion moves to the inside of the vehicle. Accordingly, the third fastening portion 13 moves rearward by the crushing stroke x. In FIG. 4B, the position of the third fastening portion 13 before movement is indicated by B13. The second fastening portion 12 moves obliquely rearward toward the inside of the vehicle. In FIG. 4B, the position of the second fastening portion 12 before movement is indicated by B12. The position of the first fastening portion 11 does not change.

In order to derive the length B of the sub-side member 3 by a numerical expression, in FIG. 4B, the lengths of respective sides of a right-angled triangle that has the third fastening portion 13, the first fastening portion 11, and the position B12 of the second fastening portion 12 before movement as apexes are obtained. The length of a side between the third fastening portion 13 and the position B12 is indicated by A−x. The length of a side between the first fastening portion 11 and the position B12 is indicated by B. Although the sub-side member 3 and the link members 8 strictly do not overlap each other perfectly, these members can be integrated and regarded as a substantially integral member. Accordingly, the length of a side between the third fastening portion 13 and the first fastening portion 11 can be approximated to a length A−B obtained by subtracting the length B of the link member 8 from the length A of the sub-side member 3. Accordingly, the respective sides of the right-angled triangle establish the relationship shown by Formula (1). Formula (2) is obtained by modifying Formula (1). The length B of the link member 8 can be obtained by substituting the length A of the sub-side member 3 and the value of the target crushing stroke x into Formula (2).

$$(A-B)^2 = (A-x)^2 + B^2 \quad \text{Formula (1)}$$

$$B = x - (x^2/2A) \quad \text{Formula (2)}$$

Figure 5:
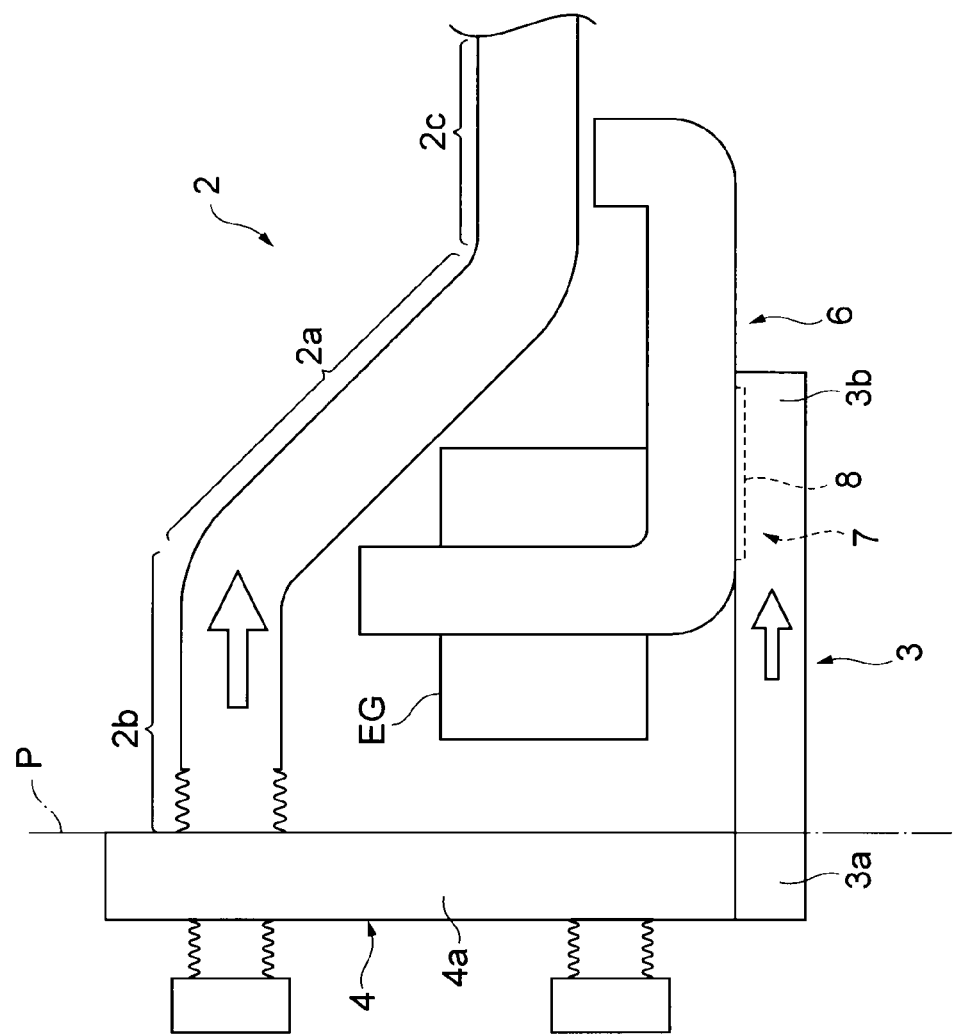
FIG. 5 is a schematic configuration view of the vehicle body structure related to the present embodiment, and is a view showing an aspect when a load is applied to a radiator support.
Figure 6:
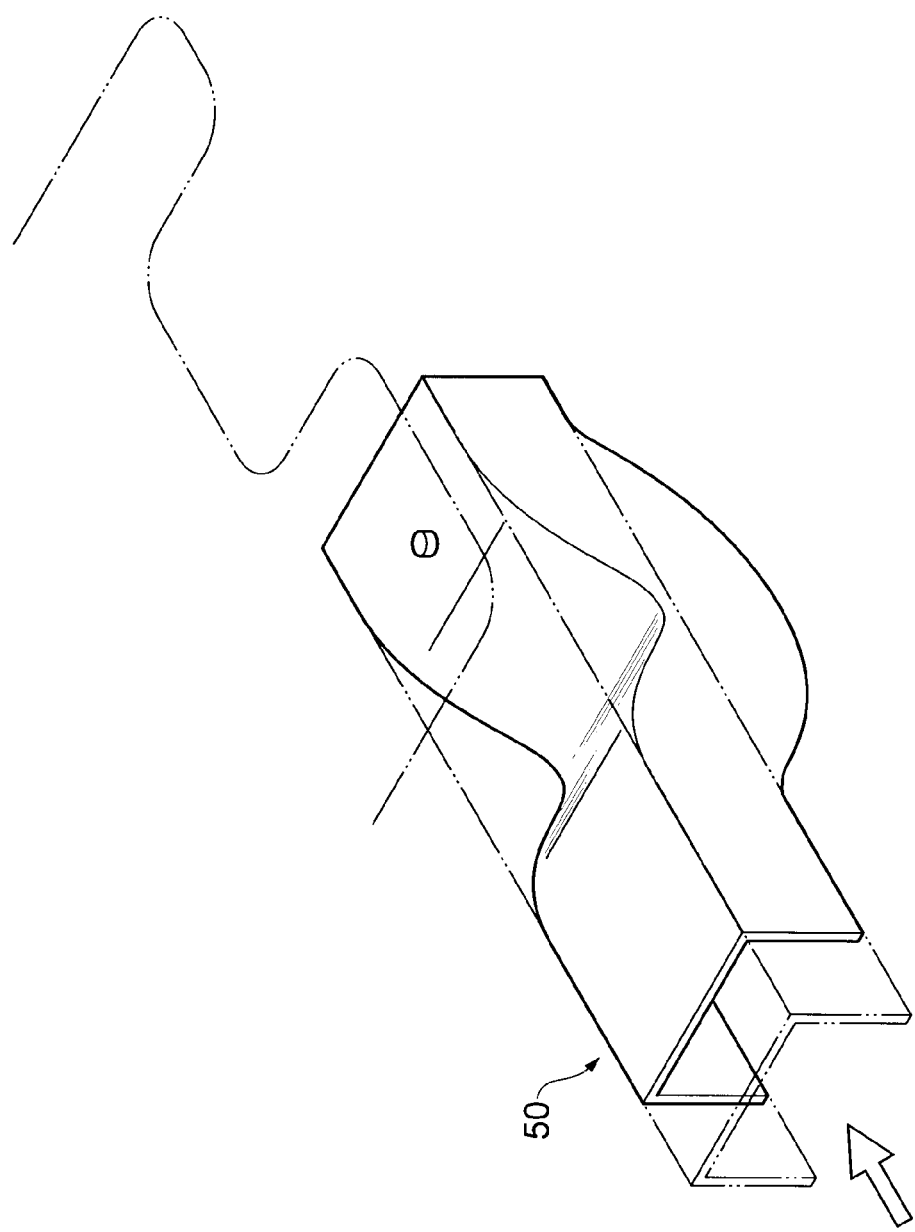
FIG. 6 is a view showing the configuration of the sub-side member in a related-art vehicle body structure.
Figure 7:
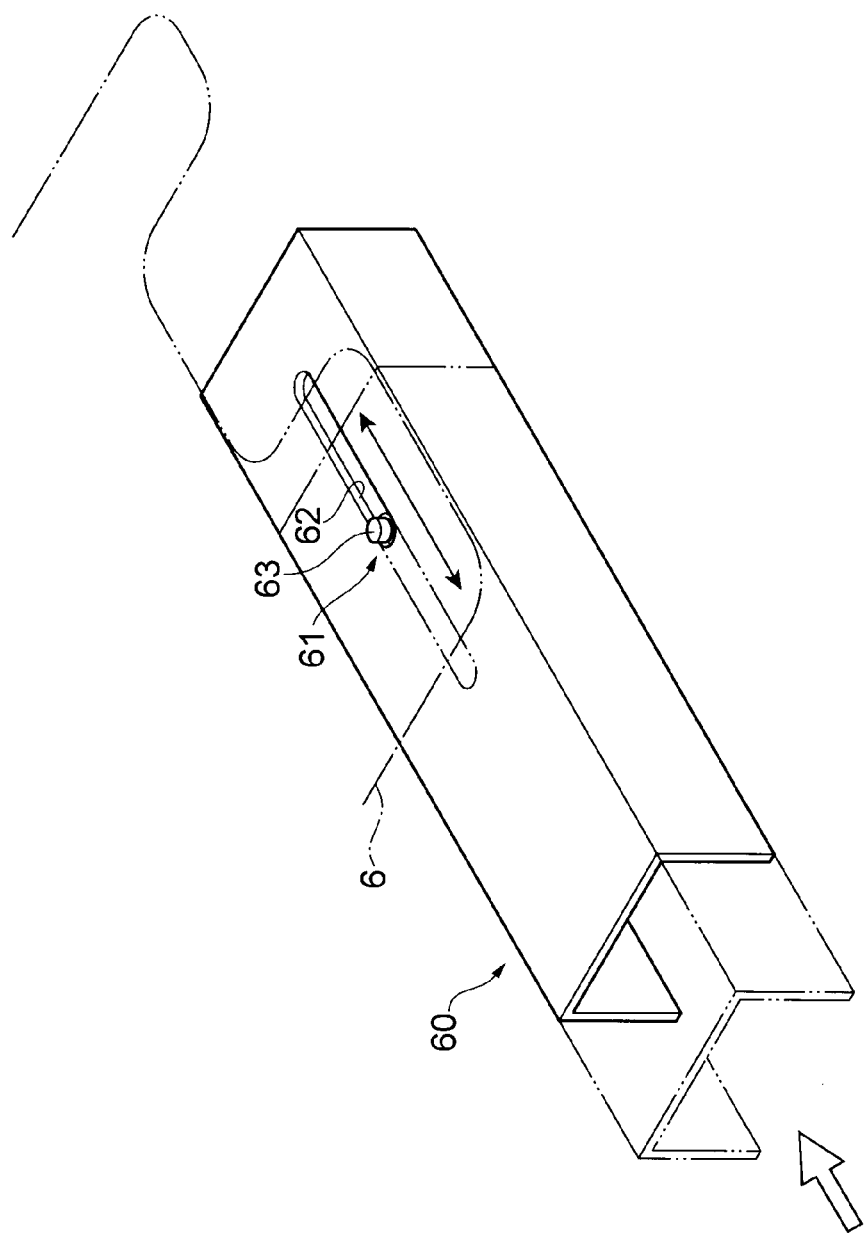
FIG. 7 is a view showing the configuration of a sub-side member in a vehicle body structure related to a modification.

Next, the functions and effects of the vehicle body structure 1 related to the present embodiment will be described with reference to FIGS. 5, 6, and 7. FIG. 5 is a schematic configuration view of the vehicle body structure 1 related to the present embodiment, and is a view showing an aspect when a load is applied to the radiator support 4. FIGS. 6 and 7 are views showing the configuration of the sub-side member in a related-art vehicle body structure.

First, the sub-side member 50 in the related-art vehicle body structure, as shown in FIG. 6, has a rear end portion directly coupled to the suspension member 6. In the related-art vehicle body structure, when the sub-side member 50 is broken in the initial stage where the load is applied, the front end portion of the sub-side member 50 retreats without generating a reaction force after that. Accordingly, the radiator support 4 is supported only by the front side member without acquiring a reaction force from the sub-side member 50.

On the other hand, as shown in FIG. 5, when a load is applied in the vehicle body structure 1 related to the present embodiment, the sub-side member 3 retreats as the link member 8 turns. Additionally, the retreat of the sub-side member 3 is suppressed at a position where the link member 8 reaches the termination position of the turning and has retreated by the target crushing stroke x. As the link member 8 turns, the sub-side member 3 can reliably retreat to the target position. Here, when a link mechanism using the link member 8 is adopted, the link mechanism has a given holding force in order to support the sub-side member 3 in a stage before a load is applied. Accordingly, the link member 8 can turn to retreat the sub-side member 3, and simultaneously generate a reaction force against the load. Accordingly, the load can be attenuated even during the retreat of the sub-side member 3. If the link member 8 reaches the termination position of the turning, the retreat of the sub-side member 3 is suppressed. Accordingly, the sub-side member 3 can generate a large reaction force against the load after having retreated to the target position. Through the above, the sub-side member 3 can move reliably while generating a reaction force to attenuate the load until the member retreats to the target position, and can generate a large reaction force after the member has retreated to the target position. Accordingly, after the front side member 2 is crushed to the target position (P shown in FIGS. 1 and 5), both the front side member 2 and the sub-side member 3 can receive the load. Thereby, the load applied to the front side member 2 is distributed to the front side member 2 and the sub-side member 3. Accordingly, an upward moment applied to the kick section 2a of the front side member 2 can be reduced. Through the above, according to the vehicle body structure 1 related to the present embodiment, the absorption performance of the load applied to the front side of the vehicle can be improved.

Additionally, as a vehicle body structure for shock absorption, it is considered that a double structure in which a rod-shaped member with a smaller external diameter and a rod-shaped member with a large external diameter on the front end side of the sub-side member are superimposed on each other is adopted. That is, a hollow rod-shaped member with a small external diameter is used as a member to which the radiator support 4 is connected, and the rear end of the small hollow rod-shaped member is connected to the front end of the hollow rod-shaped member with a large external diameter such that the small hollow-shaped member is surrounded from the outside. In such a vehicle body structure, if a load is applied to the radiator support 4, the small hollow rod-shaped member slides into the large hollow rod-shaped member toward the rear. However, according to such a vehicle body structure, a reinforced configuration is provided as the two members overlap each other on the front end side of the sub-side member after the small hollow rod-shaped member enters the large hollow rod-shaped member completely. In such a configuration, the front end side of the sub-side member cannot be compressively deformed after the end of the sliding, and unexpected deformation may occur on the rear end side. On the other hand, in the vehicle body structure 1 related to the present embodiment, the front end side is not necessarily brought into a reinforced configuration even after the sub-side member 3 has moved to retreat. Accordingly, when the sub-side member 3 is deformed after the retreat movement, the sub-side member is allowed to be compressively deformed on the front end side without being deformed unexpectedly on the rear end side (for example, compressive deformation may be made to occur easily by forming through holes or beads on the front end side). Thereby, the sub-side member 3 can perform shock absorption by both the turning part 7 on the rear end side and the compressive deformation on the front end side.

Additionally, a configuration in which the kick section 2a of the side member 2 and the suspension member 6 are slidably coupled together is also considered. In this configuration, when the suspension member 6 retreats, the space that allows the suspension member 6 to escape thereinto may be small. However, in the vehicle body structure 1 related to the present embodiment, the sub-side member 3 moves to retreat with respect to the suspension member 6. That is, the sub-side member 3 can escape into an empty space above or below the suspension member 6. Additionally, the configuration in which the kick section 2a of the side member 2 and the suspension member 6 are slidably coupled together may be combined with the vehicle body structure 1 related to the present embodiment.

Additionally, a configuration in which the sub-side member 3 is detached from the suspension member 6 when a load is applied may also be considered. However, a load may be unable to be transmitted after the detachment. On the other hand, in the vehicle body structure 1 related to the present embodiment, the sub-side member 3 can be moved relative to the suspension member 6 in a state where a coupling state is maintained by the turning part 7. Thus, the sub-side member can be moved while transmitting the load. Moreover, since the sub-side member 3 moves while maintaining the coupling, the position of the sub-side member is easily controlled. In addition, a configuration in which the sub-side member 3 is detached from the suspension member 6 when a load is applied beyond a given value may be combined with the vehicle body structure 1 related to the present embodiment.

Additionally, in the vehicle body structure 1 related to the present embodiment, the link member 8 turns to the rear of the vehicle with the first fastening portion 11 as a fulcrum as a load is applied to the sub-side member 3. Additionally, the link member 8 turns relative to the sub-side member 3 with the second fastening portion 12 as a fulcrum when a load is applied to the sub-side member 3. Fastening forces for holding the link mechanism are applied to the first fastening portion 11 and the second fastening portion 12. Accordingly, when the link member 8 turns, large reaction forces are generated in the first fastening portion 11 and the second fastening portion 12. Thereby, the sub-side member 3 can attenuate the load due to the reaction forces while retreating.

The link member 8 turns along with the rear end portion 3b of the sub-side member 3, with the first fastening portion 11 to the suspension member 6 as a fulcrum as a load is applied to the sub-side member 3. Additionally, the link member 8 turns so as to approach the sub-side member 3 as a load is applied to the sub-side member 3. As the link member 8 turns in this way so as to approach the sub-side member 3, the link member 8 and the sub-side member 3 are integrated and become an integral member considered as a straight shape (refer to FIG. 3). After the link member 8 has reached the termination position of the turning, one member considered as a straight shape can generate a large reaction force against the load. Additionally, the rear end portion 3b of the sub-side member 3 is arranged so as to be spaced apart in the vehicle width direction from the suspension member 6 via the link member 8. Accordingly, when the link member 8 has turned, the rear end portion 3b moves toward the suspension member 6. The sub-side member 3 that extends in the front-and-rear direction of the vehicle performs load transmission in a state where the sub-side member is inclined with respect to the front-and-rear direction of the vehicle after the turning of the link member 8. This can distribute the load.

The invention is not limited to the above-described embodiment. For example, a sub-side member 60 in a vehicle body structure related to a modification, as shown in FIG. 7, may be coupled to the suspension member 6 via the sliding mechanism 61. In the vehicle body structure related to the modification, an oval through hole 62 that extends in the front-and-rear direction of the vehicle is formed on the rear end side of the sub-side member 60. Before a load is applied, the sub-side member 60 and the suspension member 6 are coupled together by fastening the rear end portion of the through hole 62 and the suspension member 6 with a screw 63. A fastening force is applied by the screw 63. That is, since the sub-side member 60 and the suspension member 6 are coupled to each other with the screw 63, the members have a given holding force. Accordingly, when a load is applied, the sub-side member 60 can move rearward, and simultaneously, can generate a reaction force against the load. Accordingly, the load can be attenuated even during the retreat of the sub-side member 60. As the sub-side member moves rearward in this way, it is possible to it is possible to suppress deforming at an unexpected position by which bending dose not generate a reaction force in an initial stage where the load is applied. Additionally, the retreat of the sub-side member 60 is suppressed as the screw 61 comes into contact with the front end of the through hole 62. The sub-side member 60 can generate a large reaction force against the load after having retreated to the target position. Through the above, the sub-side member 60 can move reliably while generating a reaction force to attenuate the load until the member retreats to the target position, and can generate a large reaction force after the member has retreated to the target position. Accordingly, after the side member 2 is crushed to the target position, both the side member 2 and the sub-side member 60 can receive the load. Thereby, the load applied to the side member 2 is distributed to the side member 2 and the sub-side member 60. Accordingly, an upward moment applied to the kick section 2a of the side member 2 can be reduced. Through the above, the absorption performance of the load applied to the front side of the vehicle can be improved. Moreover, in the configuration concerned, the front end side is not necessarily brought into a reinforced configuration even after the sub-side member 60 has moved to retreat. Accordingly, when the sub-side member 60 is deformed after the retreat movement, the sub-side member is allowed to be compressively deformed on the front end side without being deformed unexpectedly on the rear end side (for example, compressive deformation may be made to occur easily by forming through holes or beads on the front end side). Thereby, the sub-side member 60 can perform shock absorption by both the sliding mechanism 61 on the rear end side and the compressive deformation on the front end side. Additionally, the sub-side member 60 moves to retreat with respect to the suspension member 6 by the sliding mechanism 61. That is, the sub-side member 60 can escape into an empty space above or below the suspension member 6. In addition, the configuration in which the kick section 2a of the side member 2 and the suspension member 6 are slidably coupled together may be combined with the vehicle body structure related to the modification. Additionally the sub-side member 60 can be moved relative to the suspension member 6 in a state where a coupling state is maintained by the sliding mechanism 61. Thus, the sub-side member can be moved while transmitting the load. Moreover, since the sub-side member 60 moves while maintaining the coupling, the position of the sub-side member 60 is easily controlled. In addition, a configuration in which the sub-side member 60 is detached from the suspension member 6 when a load is applied beyond a given value may be combined with the vehicle body structure related to the modification.

Figure 8:
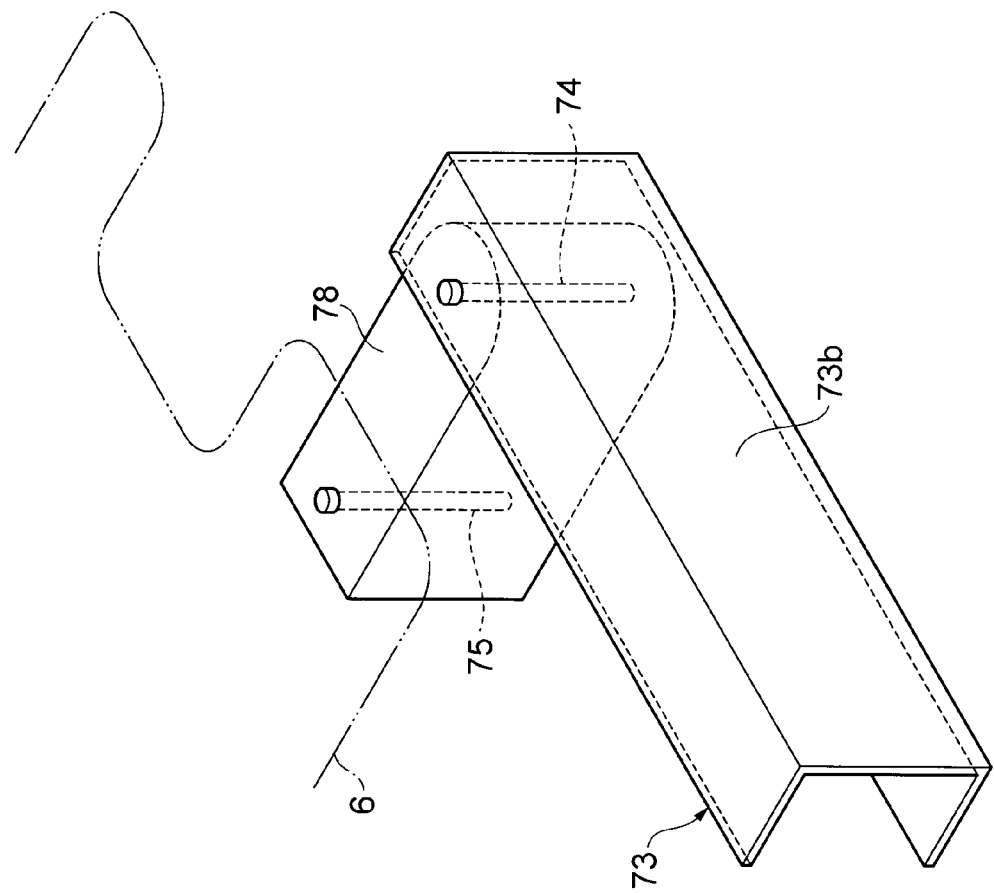
FIG. 8 is a perspective view showing a vehicle body structure related to a modification.
Figure 9:
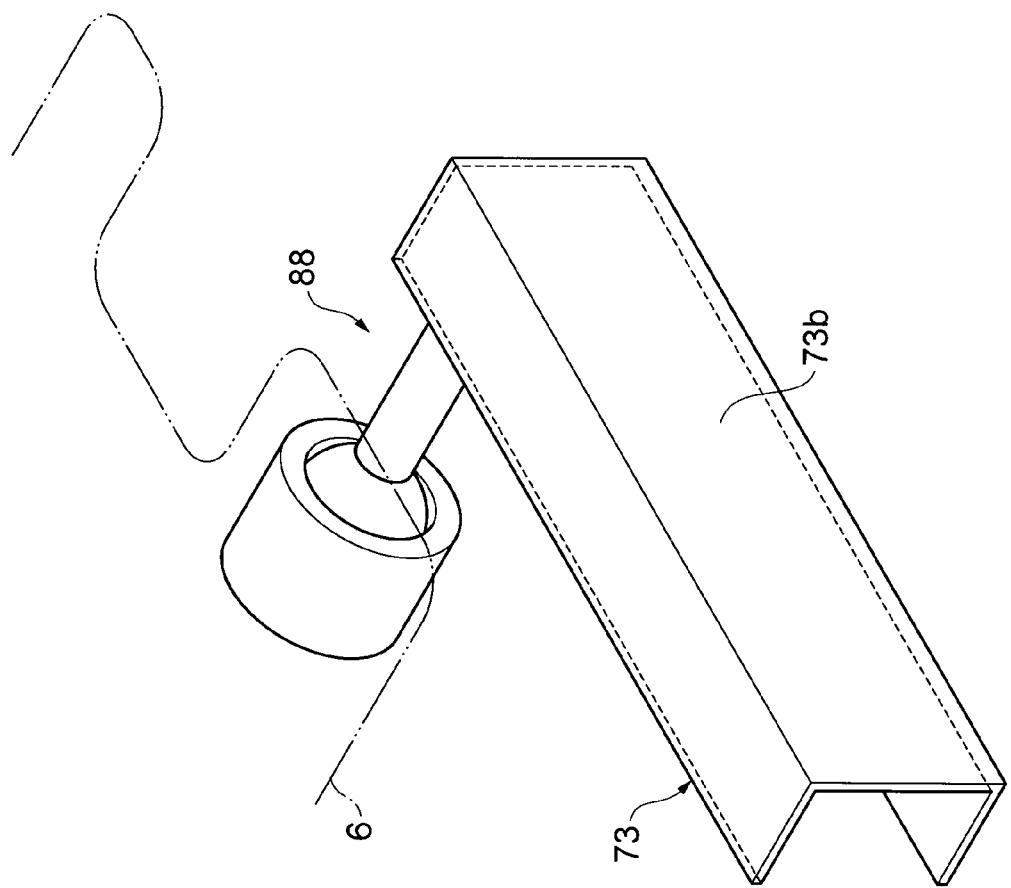
FIG. 9 is a perspective view showing a vehicle body structure related to a modification.

Additionally, as shown in FIG. 8, an upper wall 73b of a sub-side member 73 may be perpendicularly pushed down. At this time, the thickness of the link member 78 increases. Additionally, the sub-side member 73 and the link member 78 are connected together with a pin 74, and the link member 78 and the suspension member 6 are connected together with a pin 75. The pins 74 and 75 may generate fastening forces through screw-fastening or press-fitting. Additionally, as shown in FIG. 9, a universal joint 88 may be used as the link member.

The length of the link member 8 can be easily obtained using Formula (1) or Formula (2) if the angle between the sub-side member and the link member in an initial state is made right-angled. Accordingly, although it is preferable the angle between the sub-side member and the link member in an initial state is set to a right angle, the angle may not be a right angle. Additionally, the vehicle body structure related to the invention may be applied to the rear side of the vehicle without being limited to the front side of the vehicle.

INDUSTRIAL APPLICABILITY

The invention is available when the load applied to a vehicle is absorbed.

REFERENCE SIGNS LIST

1: VEHICLE BODY STRUCTURE
2: FRONT SIDE MEMBER (SIDE MEMBER)
3, 60, 73: SUB-SIDE MEMBER
3b: REAR END PORTION
7: TURNING PART
8: LINK MEMBER
11: FIRST FASTENING PORTION
12: SECOND FASTENING PORTION (CONNECTING PORTION)
61: SLIDING MECHANISM

The invention claimed is:

1. A vehicle body structure comprising:
a radiator support that extends in a width direction of the vehicle;
a side member that extends in a front-and-rear direction of a vehicle, the side member including a front end that couples to the radiator support;
a sub-side member juxtaposed to the side member; and
a turning part that is connected to the sub-side member and a suspension member, and turns around an axis extending in an up-and-down direction to the rear of the vehicle as a load is applied to the sub-side member,
wherein the sub-side member is coupled to the suspension member, and is movable relative to the suspension member as a load is applied,
the sub-side member moves relative to the suspension member as the turning part turns, and the relative movement of the sub-side member is suppressed as the turning part reaches the termination position of the turning,
the turning part includes a link member that connects the sub-side member and the suspension member,
the link member is fastened to the suspension member with a first fastening portion,
the link member is fastened to the sub-side member with a second fastening portion,
the link member turns to the rear of the vehicle with the first fastening portion as a fulcrum when a load is applied to the sub-side member, and
the link member turns relative to the sub-side member with the second fastening portion as a fulcrum when a load is applied to the sub-side member.

2. The vehicle body structure according to claim 1,
wherein the turning part includes a link member that connects a rear end portion of the sub-side member and the suspension member,
the rear end portion of the sub-side member is arranged so as to be separated in the vehicle width direction from the suspension member via the link member,
the link member turning along with the rear end portion of the sub-side member with the first fastening portion as a fulcrum as a load is applied to the sub-side member, and
the link member turns so as to approach the sub-side member as a load is applied to the sub-side member.

3. The vehicle body structure according to claim 1, further comprising:
a power unit arranged in a region surrounded by the side member, the sub-side member, and the suspension member.

* * * * *